(No Model.)
W. R. PATTERSON.
GALVANIC BATTERY.
No. 352,486. Patented Nov. 9, 1886.
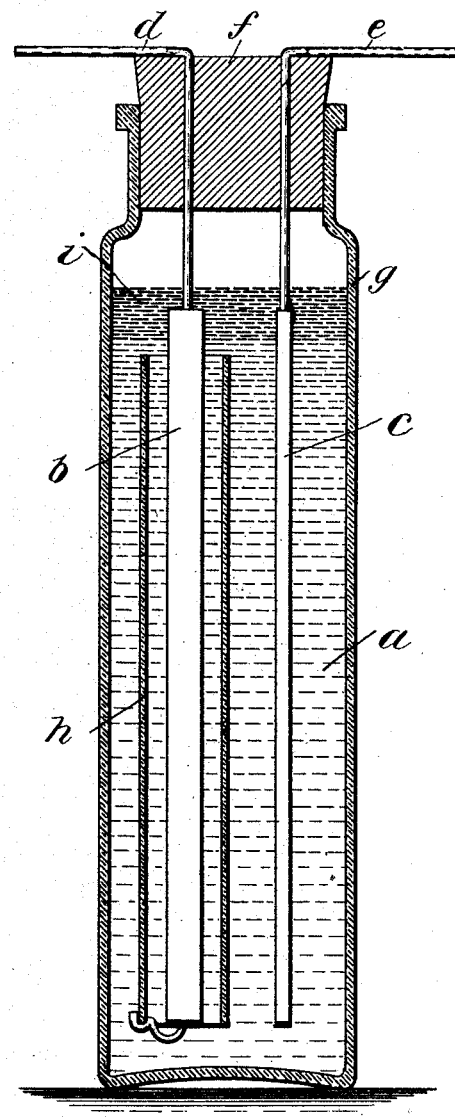
Witnesses:
Saml. B. Dover.
F. H. McCulloch.
Inventor.
William R. Patterson
by George P. Barton
Attorney.

UNITED STATES PATENT OFFICE.

WILLIAM R. PATTERSON, OF CHICAGO, ILLINOIS, ASSIGNOR TO THE WESTERN ELECTRIC COMPANY, OF SAME PLACE.

GALVANIC BATTERY.

SPECIFICATION forming part of Letters Patent No. 352,486, dated November 9, 1886.

Application filed May 24, 1886. Serial No. 203,119. (No model.)

*To all whom it may concern:*

Be it known that I, WILLIAM R. PATTERSON, a citizen of the United States, residing at Chicago, in the county of Cook and State of Illinois, have invented a certain new and useful Improvement in Galvanic Batteries, of which the following is a full, clear, concise, and exact description, reference being had to the accompanying drawing, forming a part of this specification.

My invention relates to galvanic batteries; and it consists, first, in using sufficient non-conducting oil upon the surface of the liquid of the battery to prevent chemical action upon the connecting-wires at the points where they are united with the elements of the battery.

My invention also consists in inclosing the chloride-of-silver element in a glass tube, said glass tube being open at both ends and preferably suspended above the bottom of the jar, the opening at the top of the tube coming below the lower surface of the oil.

Heretofore it has been usual in chloride-of-silver batteries to wrap the chloride-of-silver element with cloth or parchment-paper to prevent contact with the zinc. Sometimes, also, a block of rubber has been placed between the elements for the same purpose, the elements being bound together by rubber bands. When cloth or parchment has been used, in order to examine the chloride-of-silver element it has been necessary to remove it from the battery and unwind the wrapping. In the use of a block of rubber it is found that particles of silver or zinc becoming detached will fall and lodge upon the block of rubber, thus forming electrical connection between the two elements. By the use of a transparent tube, as herein described, the chloride of-silver elements may be readily inspected at any time without removal from the jar. This tube being open at both ends allows the liquids to circulate freely and prevents connection between the silver and zinc elements.

In the accompanying drawing I have shown a sectional view of a cell of battery embodying my invention.

The liquid $a$ may be a solution of sal-ammoniac, such as is commonly used in chloride-of-silver batteries. The chloride-of-silver element $b$ and the zinc element are suspended by their connecting-wires $d$ and $e$, which pass through the cork $f$ inserted in the jar $g$. The connecting-wire $d$ is of silver, and is preferably bent at its lower end to form a support for the glass tube $h$. The oil $i$ is sufficient to cover the joint between the zinc element and its connecting-wire $e$, which, on account of the protection of the non-conducting oil, may be of copper instead of silver, as heretofore required, and may be connected with the zinc by solder.

Oil has heretofore been used upon the surface of galvanic batteries to retard evaporation and prevent the salts from forming in crystals on the side of the jar. A non-conducting oil, however, has not been used, to my knowledge, to prevent galvanic action at the junction of dissimilar metals. If the junction between the copper wire and the zinc element were covered with the sal-ammoniac solution, there would be injurious local action between the copper and the zinc, and between the copper and the silver there would be injurious galvanic action. Even when silver wire has been used to connect with the zinc injurious local action has not been avoided. Non-conducting oil therefore may be used to advantage with a silver connecting-wire, and in any case when solder is used at the joint the non-conducting oil is of great advantage. The joint between the connecting-wire and the zinc element has also been painted or paraffined heretofore, but the results have been unsatisfactory.

It is found better to close the jar by the cork $f$ or otherwise to prevent spilling the liquid. The jar, however, may be left open, in which case the wires are simply bent over the upper edge of the jar.

Having thus described my invention, I claim as new and desire to secure by Letters Patent—

1. The combination, with the chloride-of-silver element of a galvanic battery, of a transparent non-conducting tube open at both ends inclosing said element, substantially as and for the purposes specified.

2. In a galvanic battery, the combination, with the zinc element, of a copper connecting-wire, and an insulating-oil upon the surface of the liquid covering the joint between said zinc element and its copper connecting-wire, as described.

3. In a galvanic battery, the chloride-of-silver element and the zinc element and their respective connecting-wires, in combination with non-conducting oil floating upon the liquid of the battery and covering the joint between the zinc element and its connecting-wire, and a transparent tube surrounding the chloride-of-silver element, the upper end of said tube being below the oil, substantially as and for the purpose specified.

In witness whereof I hereunto subscribe my name this 20th day of May, A. D. 1886.

WILLIAM R. PATTERSON.

Witnesses:
GEORGE P. BARTON,
F. H. McCULLOCH.